United States Patent
Gardner

(10) Patent No.: US 6,536,821 B1
(45) Date of Patent: Mar. 25, 2003

(54) SUSPENDED SLIDE-OUT ROOM FOR MOBILE LIVING QUARTERS

(76) Inventor: Stewart Gardner, 17812 County Rd. 10, Bristol, IN (US) 46507

( * ) Notice: Subject to any disclaimer, the term of this patent is extended or adjusted under 35 U.S.C. 154(b) by 0 days.

(21) Appl. No.: 09/990,042

(22) Filed: Nov. 20, 2001

Related U.S. Application Data

(60) Provisional application No. 60/252,211, filed on Nov. 21, 2000.

(51) Int. Cl.[7] .............................................. B60R 27/00
(52) U.S. Cl. ................................. 296/26.01; 296/26.12; 296/26.13; 296/26.14; 296/165; 296/171
(58) Field of Search ........................ 296/26.01, 26.12, 296/26.13, 26.14, 26.15, 175, 176, 26.02, 26.03, 165, 171; 52/67

(56) References Cited

U.S. PATENT DOCUMENTS

| | | | | |
|---|---|---|---|---|
| 5,560,667 A | * | 10/1996 | Edry | 296/175 |
| 5,570,924 A | * | 11/1996 | Few et al. | 296/175 |
| 5,586,802 A | * | 12/1996 | Dewald, Jr. et al. | 296/171 |
| 5,620,224 A | * | 4/1997 | DiBiagio et al. | 296/165 |
| 5,785,373 A | * | 7/1998 | Futrell et al. | 296/26.01 |
| 5,787,650 A | * | 8/1998 | Miller et al. | 52/67 |
| 5,857,733 A | * | 1/1999 | Dewald, Jr. et al. | 296/175 |
| 5,908,215 A | * | 6/1999 | Hanser et al. | 296/26.15 |
| 5,971,471 A | * | 10/1999 | Gardner | 296/165 |
| 6,135,525 A | * | 10/2000 | Amann | 296/26.11 |
| 6,152,520 A | * | 11/2000 | Gardner | 296/175 |
| 6,325,437 B2 | * | 12/2001 | Hiebert et al. | 296/26.01 |

* cited by examiner

*Primary Examiner*—D. Glenn Dayoan
*Assistant Examiner*—G Blankenship
(74) *Attorney, Agent, or Firm*—James D. Hall; Thomas P. Riley

(57) ABSTRACT

A slide-out room for recreational vehicles, sleeper cabs of trucks, and similar mobile living quarters is supported for movement through an aperture in the side wall of the mobile living quarters by a set of four linkages, two of which are mounted between each side of the slide-out room in the corresponding side of the aperture of the side wall of the unit. When the slide-out room is fully retracted within the mobile living quarters, one of the linkages on each side of the slide-out room is fully extended and the other is fully collapsed. As the slide-out room is moved toward the fully-extended position, the other linkage gradually expands and the one linkage collapses, so in the fully extended, as well as the fully retracted position, the slide-out room is supported and aligned for movement through the aperture in the vehicle slide-out room, and the slide-out room is continuously supported as it travels between the extended and retracted positions. Accordingly, the slide-out room is suspended above the floor of the main living quarters and does not slide on the floor of the main living quarters, so that actuation power requirements are minimized. The linkages are designed to maintain the floor of the slide-out room level during its movement between the extended and retracted positions.

17 Claims, 8 Drawing Sheets

US 6,536,821 B1

SUSPENDED SLIDE-OUT ROOM FOR MOBILE LIVING QUARTERS

CROSS REFERENCE TO RELATED APPLICATION

This is a continuation of provisional application serial No. 60/252,211 filed Nov. 21, 2000.

This invention relates to a slide-out room that may be extended from the main living area of mobile living quarters, mobile living quarters include, but are not limited to, travel trailers, fold-out tent campers, motor homes, and similar recreational vehicles, and sleeper cabs of heavy duty trucks. Accordingly, a larger living space is provided when the mobile living quarters is parked for use.

BACKGROUND OF THE INVENTION

The living area provided by recreational vehicles is limited to that which may be conveniently towed behind a conventional towing vehicle, such as a passenger car, light truck, or sports utility vehicle. Accordingly, the living area provided by such recreational vehicles is extremely limited, and it is desirable that supplemental living quarters be provided in the form of a slide-out room which can be extended from the recreational vehicle when the unit is parked to provide additional living space, but which may be retracted into the recreational vehicle when the vehicle is moved and the occupants are not within the living area. Similarly, sleeper cabs of heavy trucks are limited to a volume not interfering with articulation of the vehicle and conforming to the standard width and length of such vehicles. Many different types of slide-out rooms are known to those skilled in the art, but any such slide-out room must maintain its alignment with the aperture in the walls of the mobile living quarters through which the slide-out room extends and retracts. It is also desirable that the actuation forces required to operate the slide-out room be as small as possible. Low actuation forces minimize the size and power required of an electric motor which drives the room between the extended and retracted position.

SUMMARY OF THE INVENTION

According to present invention, a slide-out or retractable room for a recreational vehicle, sleeper cab of a heavy duty truck or similar mobile living quarters is supported for movement through an aperture in the side wall of the mobile living quarters by a set of four linkages, two of which are mounted between each side of the slide-out room and the corresponding side of the aperture in the side wall of the mobile living quarters. When the slide-out room is fully retracted within the mobile living quarters, one of the linkages on each side of the slide-out room is fully extended and the other is fully collapsed, and as the slide-out room is moved toward the fully extended position, the other linkage gradually expands and the one linkage collapses, so that in the fully extended position, as well as the fully retracted position, the slide-out room is supported and aligned for movement within the aperture in the vehicle side wall, and the slide-out room is continuously supported as it travels between the extended and the retracted position. Accordingly, the slide-out room is suspended above the floor of the main living area and does not slide on the floor of the main living area, so that actuation power requirements are minimized. One end of each of the main links of each linkage is mounted in a vertically extending track mounted on the side wall, thereby assuring that the floor of the slide-out room remains flat as the slide-out room is extended and retracted.

DESCRIPTION OF THE DRAWINGS

These and other advantages of the present invention will become apparent from the following description, with reference to the accompanying drawings, in which.

DETAILED DESCRIPTION OF THE DRAWINGS

Figure 1:
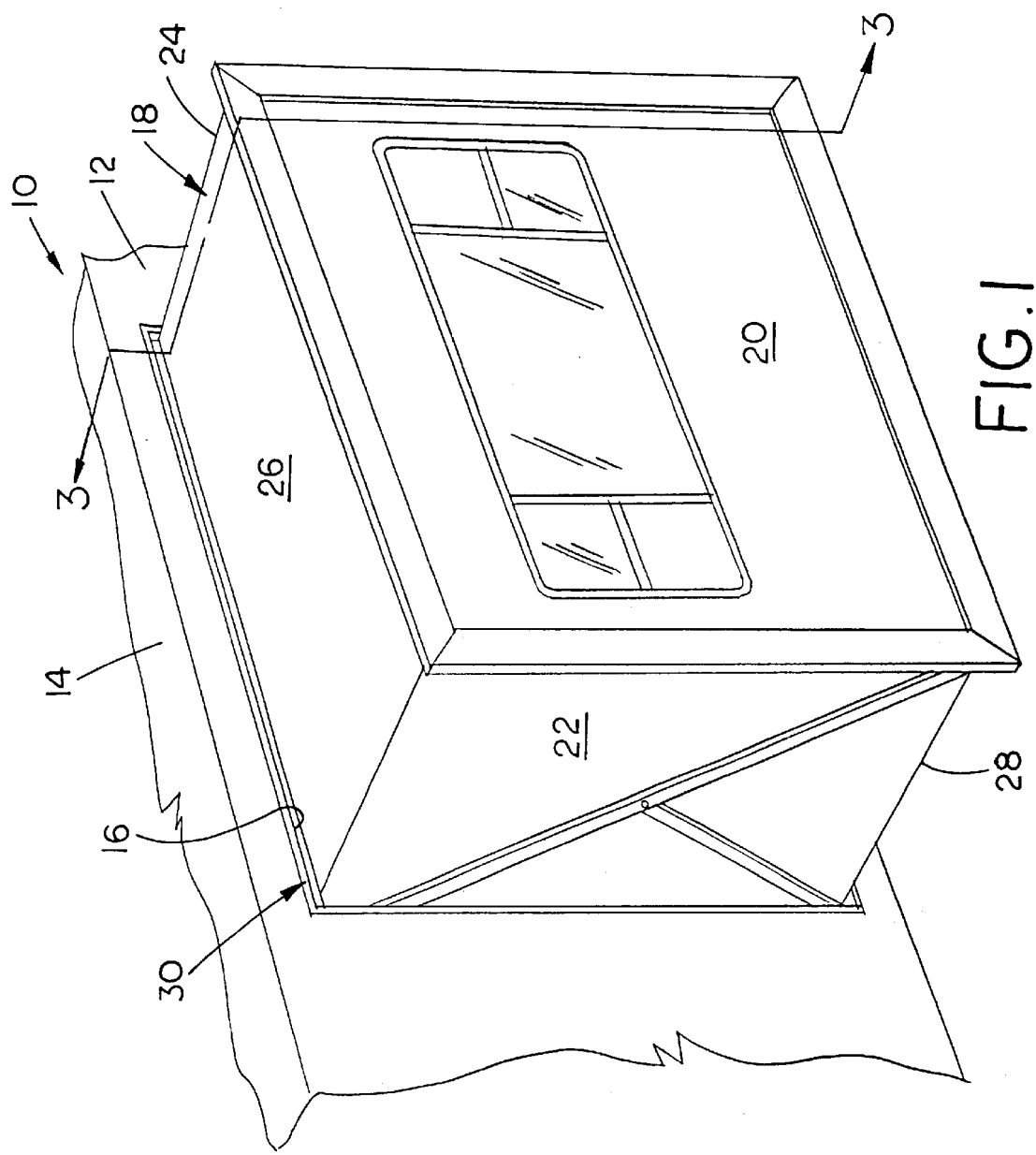
FIG. 1 is a fragmentary view in perspective of a mobile living quarters equipped with a slideout room made pursuant to the teachings of the present invention, the slide-out room being shown in the fully extended position.

Referring now to the drawings, mobile living quarters (a recreational vehicle being shown), is generally indicated by the numeral 10. The mobile living quarters 10 includes structure including a side wall 12 and a ceiling 14. An aperture 16 is defined within the side wall 12 through which a slide-out room generally indicated by the numeral 18 extends and retracts. The slide-out room 18 includes a front wall 20, side walls 22, 24, a ceiling 26, and a floor 28. A frame 30 is mounted on the side wall 12 and supports the slide-out room 18 for extension and retraction through the aperture 16.

Figure 2:
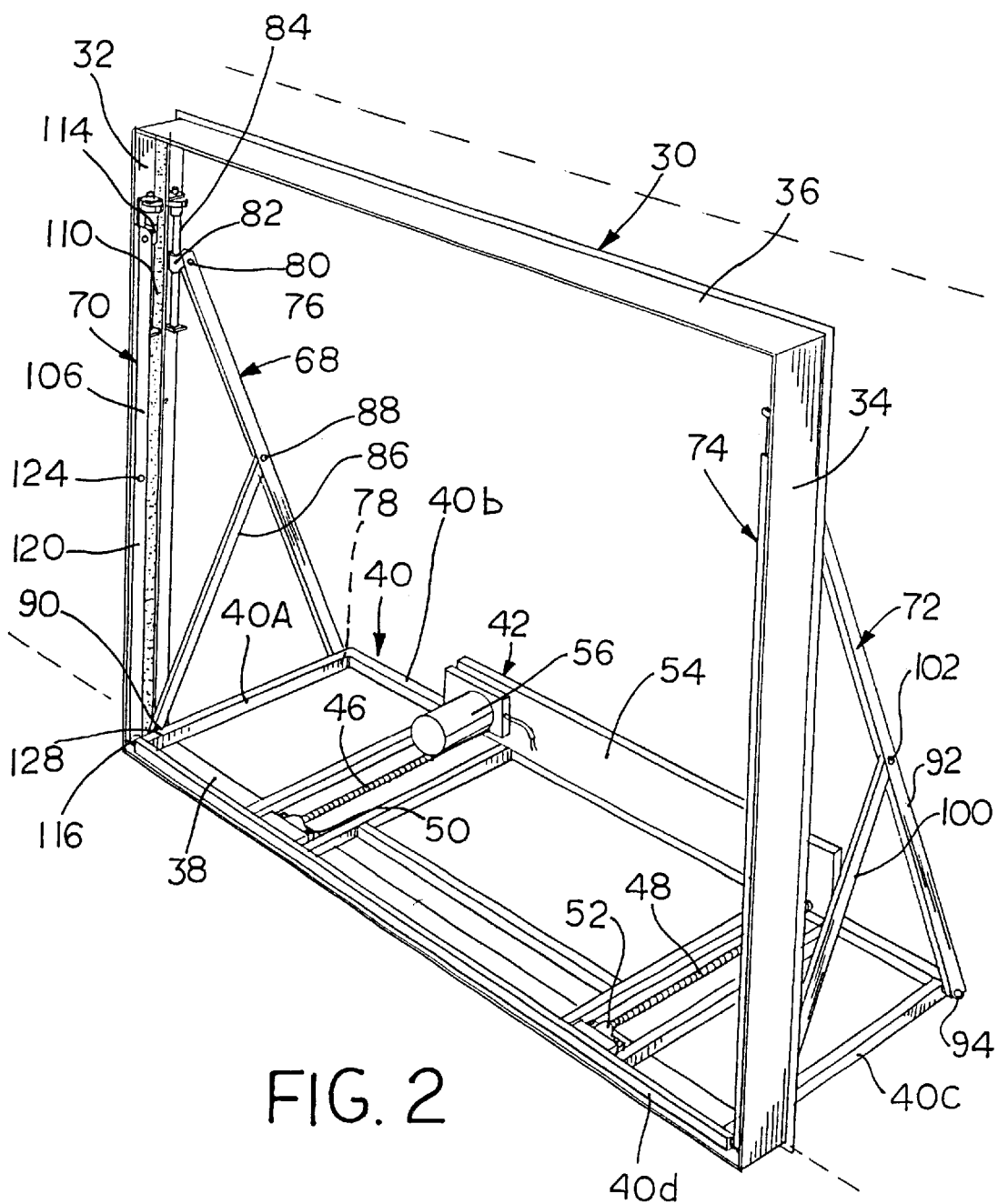
FIG. 2 is a view in perspective of the frame which supports the floor and walls of the slide-out room illustrated in FIG. 1.

Referring to FIG. 2, the frame 30 includes side frame members 32 and 34, which extend on opposite side edges of the aperture 16 and are secured to the side wall 12, an upper transverse frame member 36, which is secured to side wall 12 and extends along the upper edge of the aperture of 16, and a lower transverse frame member 38, which is secured to the lower edge of the aperture 16. Frame 30 further includes a floor frame indicated by the numeral 40 which moves across, but is suspended above, the lower frame member 38 as the slide-out room is extended and retracted. An actuation mechanism generally indicated by the numeral 42 is mounted on the floor frame 40. Floor 44 itself (see FIGS. 4 and 6), although supported by the floor frame 40, is built up to extend over the actuation mechanism 42.

Actuation mechanism 42 includes a pair of jack screws 46, 48, the front ends of which are rotatably secured to frame 40 by brackets 43, 45 (FIG. 6) and which are threadedly engaged in corresponding bearing blocks 50, 52 which are secured to lower frame member 38. The ends of the jack screws 46,48 opposite brackets 43,45 are rotatably supported in elongated support member 54, upon which a conventional reversible electric motor 56 is mounted. Electric motor 56 drives a sprocket 58, which drives sprockets 60, 62, which are rigidly mounted on the end of the corresponding jack screws 46, 48, through a chain 64.

Additional sprockets 66 may mounted on the support 54 to support the chain 64 and to take up slack therein to assure that the jack screws 46, 48 are driven by the motor 56. The electric motor, being reversible, drives the chain 64 in either direction, to thereby extend and retract the slide-out room.

The floor frame 40 is supported for movement from between the extended and retracted positions by a first set of linkages 68,70, which extend between the floor frame 40 and the side frame member 32, and by a second set of linkages 72, 74, which extend between the floor frame 40 and the side edge 74. This can be seen in FIG. 2, and as will hereinafter be explained, with the floor 40 in the retracted position illustrated in FIGS. 2, 5 and 6, the linkages 68 and 72 are expanded and the linkages 70 and 74 are collapsed, so that the slide-out room is supported primarily by linkages 68, 72, in the retracted position. When the floor frame 40 is moved into the fully extended position illustrated in FIGS. 3 and 4, the linkages 68 and 72 are collapsed and the linkages 70 and 74 are extended, so that the slide-out room is primarily supported by the linkages 70 and 74 in the extended position.

Linkage 68 includes a main linkage member 76, which is pivotally connected to floor frame 40 along side edge 40a floor frame member 40, adjacent the rear edge 40b thereof. The opposite end of main frame member 76 is connected by pivot connection 80 to a bearing block 82 which slides alone rail 84 which is mounted vertically on side frame member 32 adjacent the upper edge thereof. Linkage 68 further includes a secondary linkage member 86, one end of which is connected to main linkage member 76 by a pivot connection 88. The opposite end of secondary linkage member 86 is pivotally and slidably connected to floor side member 40a by a sliding and pivoting connection generally indicated by the numeral 90.

The linkage 72 includes main linkage member 92, which is pivotally connected to floor frame 40 via pivot connection 94 on side edge member 40c of floor frame 40 adjacent the edge member 40b. The opposite end of linkage member 92 is pivotally attached by pivot 94 to a bearing block 96 that slides along a vertically extending rail 98 mounted on side frame member 34 (see FIG. 5). Linkage 72 further includes a secondary linkage member 100 that is pivotally connected to main linkage member 92 via pivot 102 at one end thereof. The opposite end of secondary linkage member 100 is slidably and pivotally connected to frame member 40C of floor frame 40 via pivot connection 104.

The linkages 70, 74 are similar to the linkages 68 and 72, respectively. Each of the linkages 70, 74 include a main linkage member 106, 108, which are at one end pivotally connected to vertically extending rails 110, 112, which are similar to their adjacent rails 84, 98. Each of the linkages 70, 74 are connected to their corresponding rails 110 to 112 via appropriate bearing blocks 114, 116 which connect the main linkage members 106, 108 to slide and pivot relative to their corresponding rails 110, 112. The opposite end of each of the main linkage members 106, 108 are connected to the side frame members 40a, 40c via pivot connections 116, 118, adjacent the end thereof, secured to the front frame member 40d. Secondary linkage members 120, 122 are connected to their corresponding main linkage members 106, 108 via pivot connections 124, 126 and are connected for sliding and pivoting motion about the corresponding side frame members 40a and 40c by connections from 128, 130, which permit the end secondary linkage members 120, 122 to slide and pivot with respect to the corresponding end frame members 40A and 40C.

Figure 5:
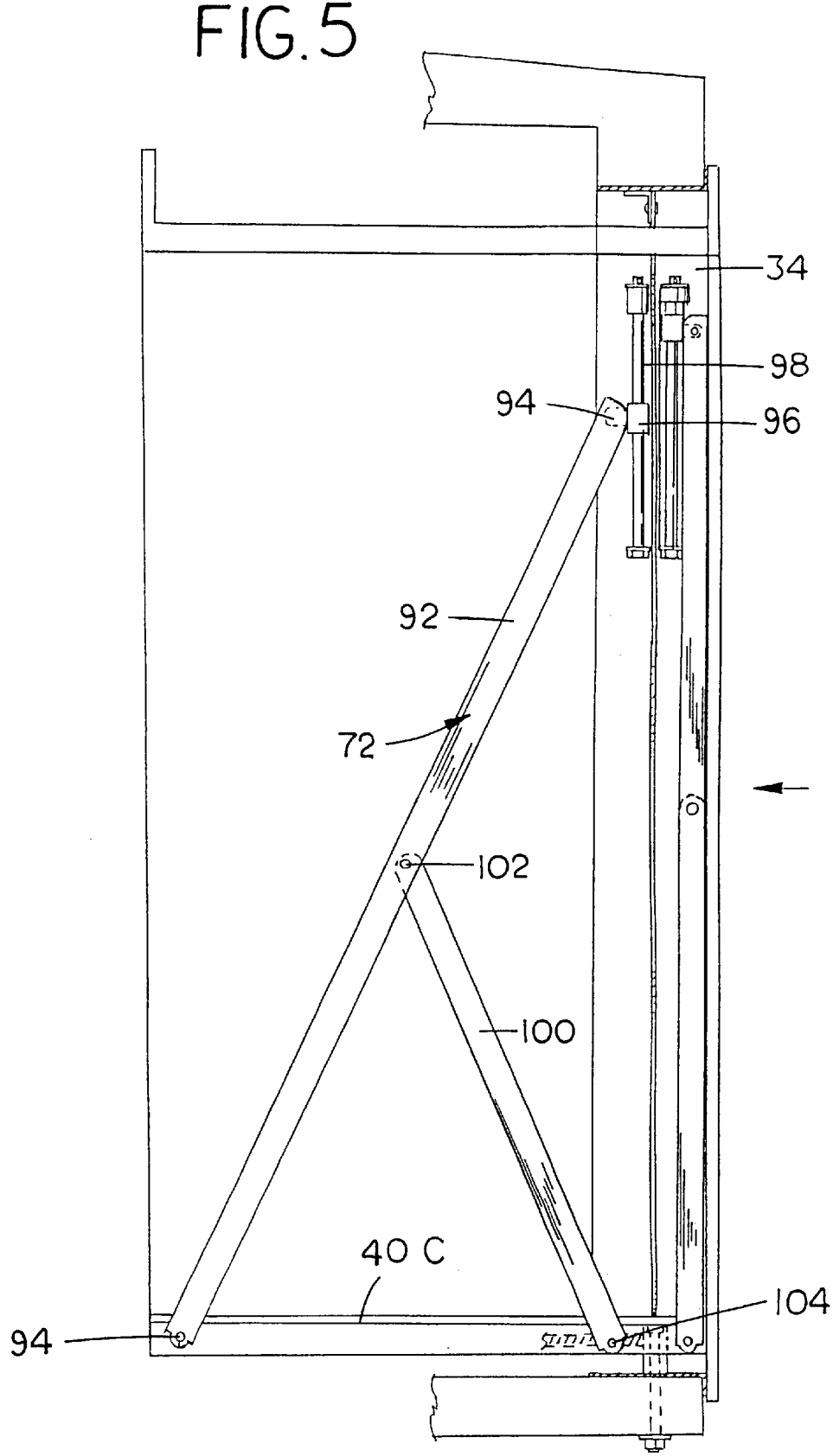
FIG. 5 is a view similar to FIG. 3, but illustrating the slide-out room in the fully retracted position.
Figure 6:
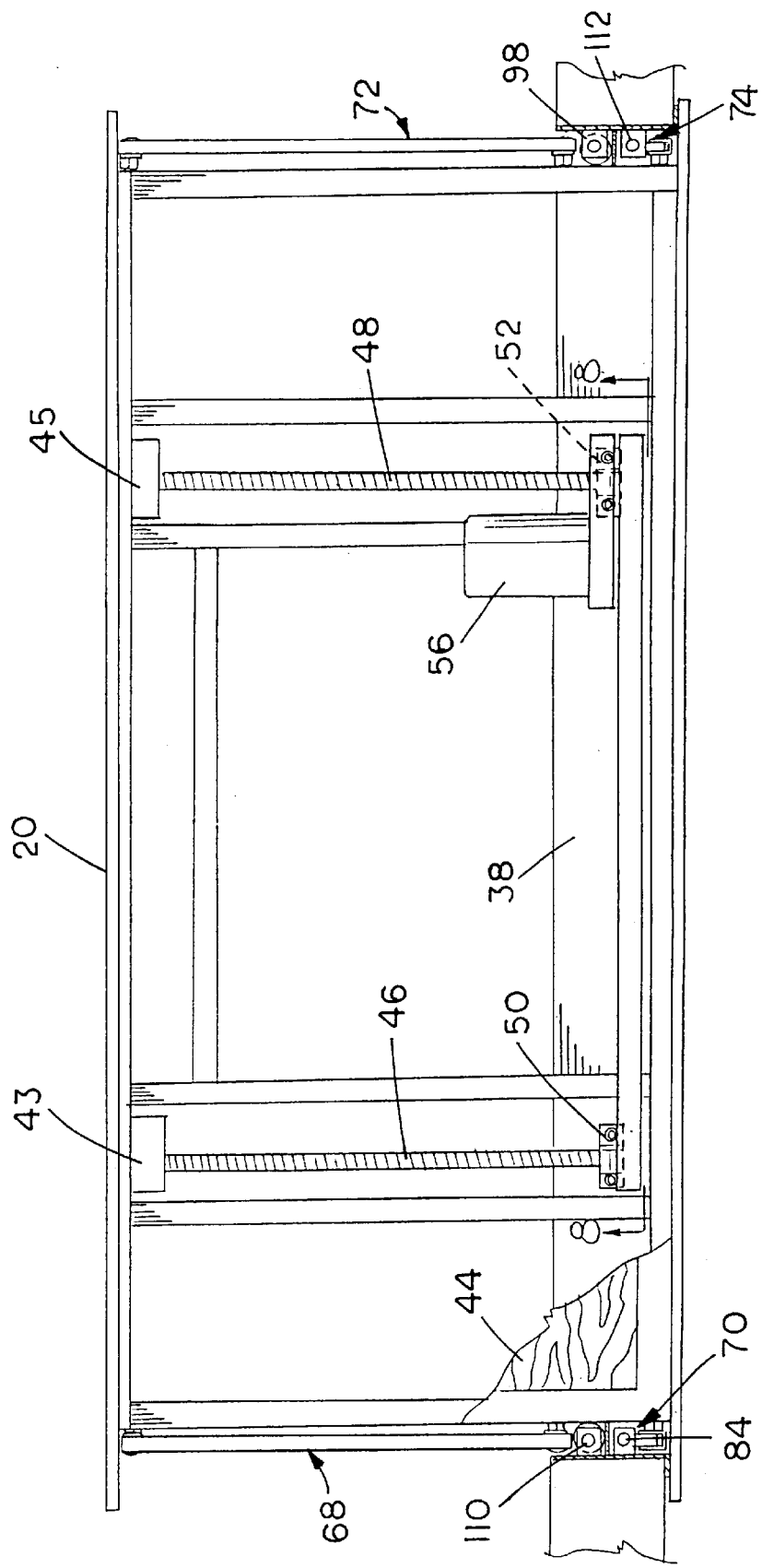
FIG. 6 is a view similar to FIG. 4, but illustrating the slide-out room in its fully retracted position.
Figure 7:
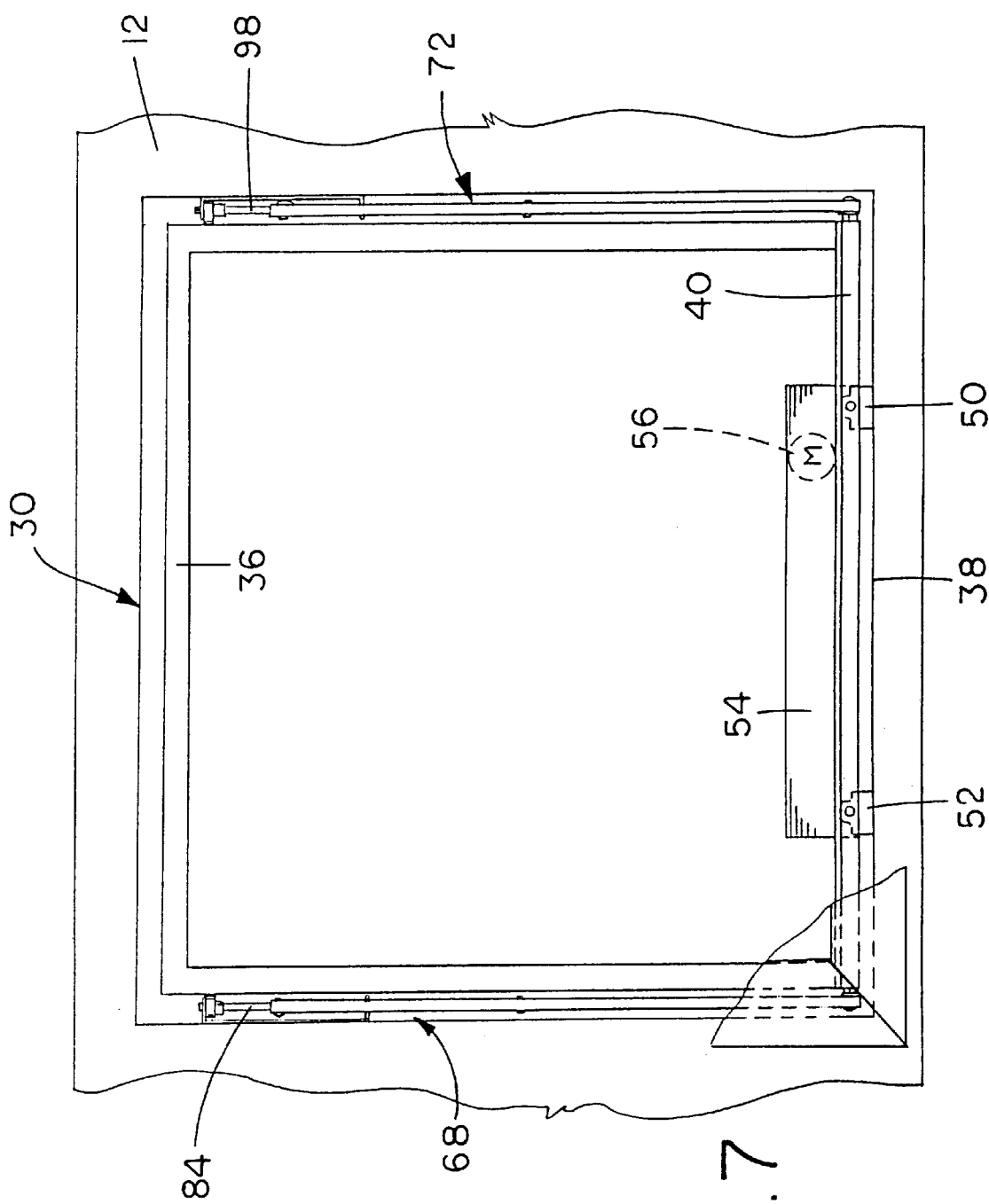
FIG. 7 is a side elevational view of the frame illustrated in FIG. 2, installed in the aperture of mobile living quarters on which slide-out room is mounted.
Figure 8:
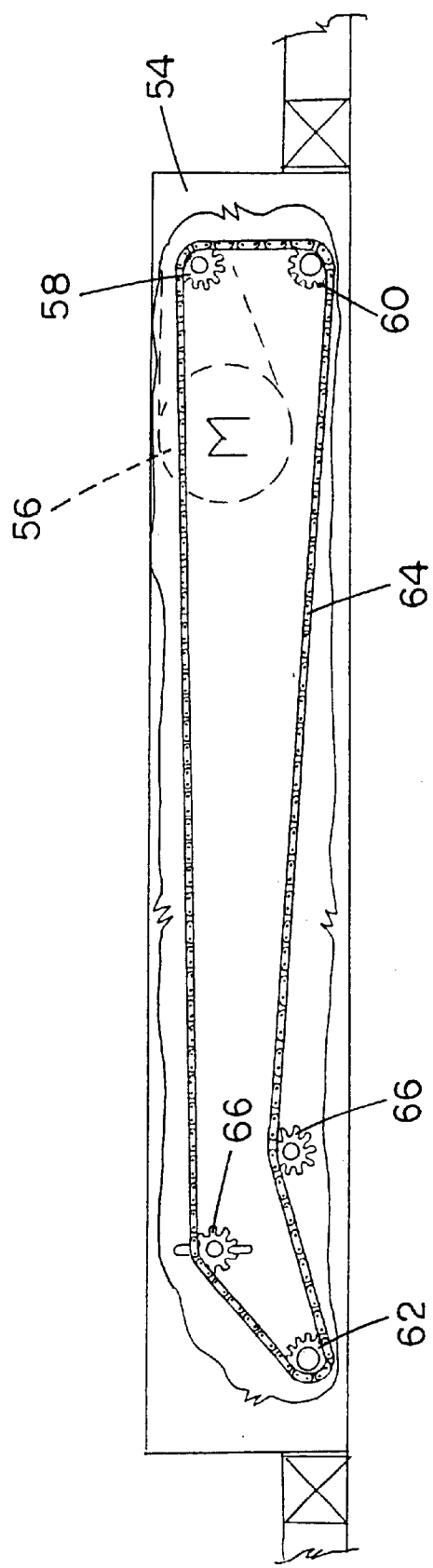
FIG. 8 is a view taken from behind of the action inflation mechanism illustrated in FIG. 2 mounted on the frame supporting the slide-out room.

In operation, the slide-out room 18 is illustrated in its retracted position in FIGS. 2, 5 and 6. In the retracted position, the floor frame 40, and, accordingly, the slide-out room 18, is supported by the expanded linkages 68, 72. Although the slide-out room moves over the floor of the main living quarters (and across the lower frame member 38) as the slide-out room is moved from the retracted position illustrated in FIGS. 2, 5 and 6, the frame 40 is not supported on the floor of the main living quarters. Therefore floor frame 40 does not slide across the floor of the main living quarters. Instead, the frame 40 is held suspended above the floor of the main living quarters and the lower frame member 38 by the linkages 68 and 72. As the room is advanced toward the extended position, the frame 40 is separated from the floor of the main living quarters by an air gap therebetween.

Figure 3:
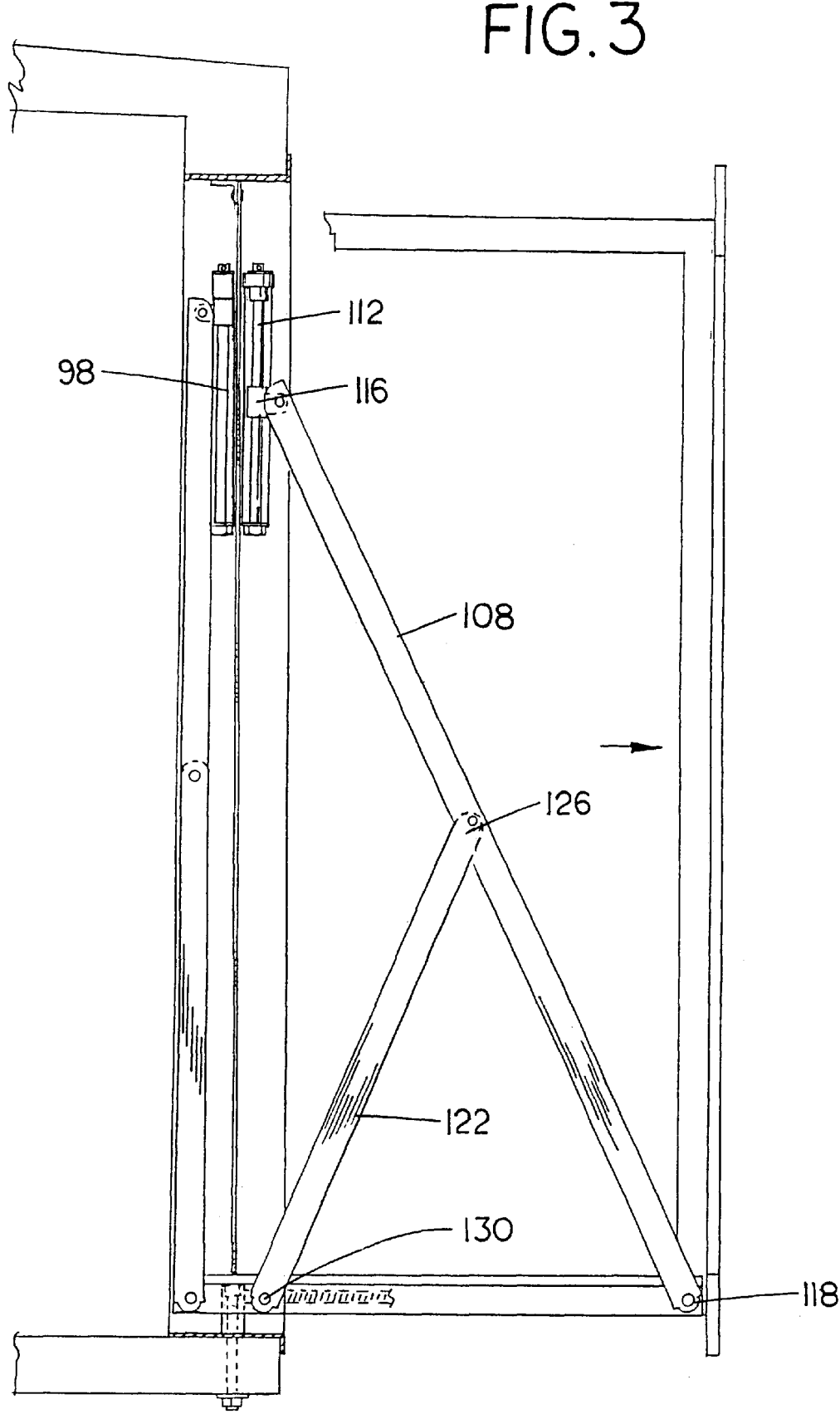
FIG. 3 is a fragmentary cross-sectional view taken substantially along lines 3—3 of FIG. 1.
Figure 4:
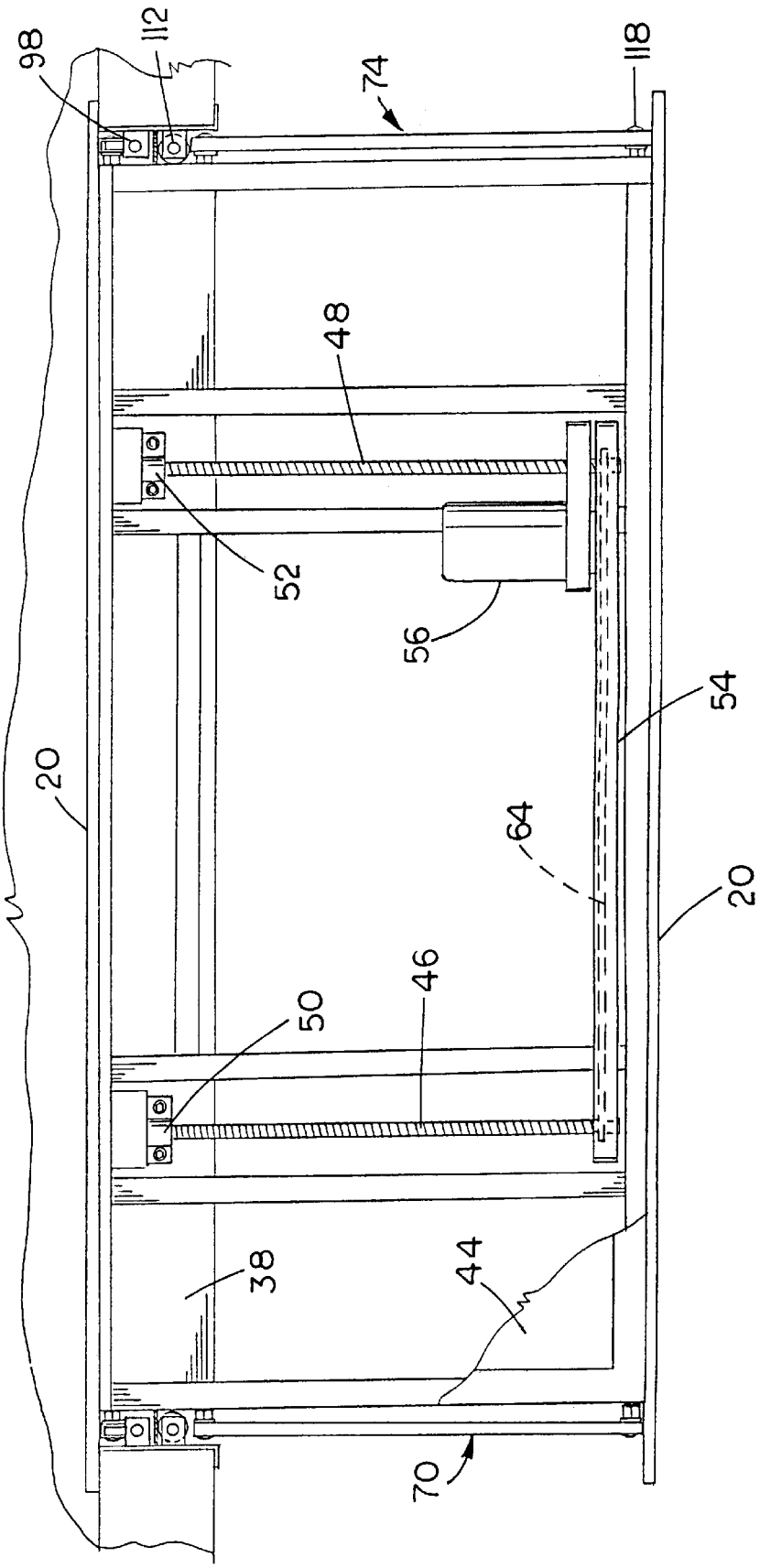
FIG. 4 is a top plan view of the slide-out room illustrated in FIG. 1, taken from below the slide-out room, the slide-out room being shown in the extended position.

The slide-out room is advanced from the retracted position illustrated in FIGS. 2, 5 and 6 toward the extended position illustrated in FIGS. 1, 3 and 4 by operating the electric motor 56 in a direction advancing the jack screws 46, 48 through the bearing blocks 50, 52, forcing the frame 40. (and therefore the slide-out room 18) toward the extended position. As the slide-out room advances from the retracted position, the main linkage members 76, 92 of the linkages 68, 72 advance from their angled positions illustrated in FIGS. 2 and 5 toward their substantial vertical positions illustrated in FIGS. 3 and 4, which they assume when the slide-out room is in the fully extended position. During this movement Of the main linkage member 76, 92, the secondary linkage members 68 pivot about their ends at pivot connections 102, 104, so that the secondary linkage members 86, 100 also gradually move toward a vertical position. The opposite end frame members 40a, 40c slide relative to the ends of the secondary linkage members 86, 100 about the pivot and sliding connections 90,104.

As the slide-out room is moved away from the retracted position and into the extended position, the linkages 70 and 74 are expanding from their collapsed positions illustrated in FIGS. 2, 5 and 6 toward their extended active positions illustrated in FIGS. 3 and 4. As the frame 40 moves, the lower ends of the secondary linkage members 100, 120 slide along their corresponding side frame members 40a, 40c and also pivot about their ends 102, 124 as their corresponding main linkage members 92, 106 assume the angled positions illustrated in FIGS. 4 and 5. Accordingly, when the slide-out room is in the fully extended position, the linkages 70 and 74 are extended to support the slide-out room, and the linkages 68, 72 collapse into their vertical positions.

It will be noted that the floor frame 40, and therefore the entire slide-out room, is supported solely by the linkages 70, 74 and 68, 72 so that the floor frame 40 is at all times maintained support above the floor of the main living quarters and above the lower frame member 38. Accordingly, the only resistance to movement of the slide-out room is provided by the resistance of the various pivot. and sliding connections of the linkages, and no resistance is caused by any sliding engagement with the main living quarters, since the frame 40 is supported above the floor of the main living quarters with an air gap therebetween. It will also be noted that the floor frame 40 is at all times during movement between the extended and retracted positions in a horizontal orientation because of the various linkages and the fact that their upper ends are allowed to move vertically along the tracks 84, 114 and 98, 112. The slide-out room can be retracted from its fully extending condition by reversing electric motor 56, thereby reversing the jack screws 46, 48 to withdraw them from the bearing blocks 50, 52 toward the frame 30.

I claim:

1. Mobile living quarters having a main living quarters and a slide out room slidable relative to the main living quarters between a retracted position retracted within the main living quarters and an extended position extended from the main living quarters, a pair of linkages each movable between an expanded position and a collapsed position, each of said linkages being pivotally and slidably connected to both said main living quarters and said slide out room to permit one of said linkages to move from its expanded position to its collapsed position as the slide out room moves from the retracted to the extended position while the other of said linkages simultaneously moves from its collapsed position to its expanded position, said one linkage moving between its collapsed position to its expanded position as the slide out room moves from the extended position to the retracted position while the other linkage simultaneously moves from its expanded position to its collapsed position.

2. Mobile living quarters as claimed in claim 1, wherein an aperture is defined by side walls and said slide out room includes a floor having side edges, said linkages being connected between one of the side walls of the aperture and a corresponding one of the side edges of the floor.

3. Mobile living quarters as claimed in claim 2, wherein said main living quarters includes a floor and said linkages in their collapsed and extended positions have a length supporting the floor of the slide out room off of the floor of the main living quarters.

4. Mobile living quarters as claimed in claim 2, wherein said linkages include pivot connections slidably mounted on said one side wall and restrained for movement along said side wall.

5. Mobile living quarters as claimed in claim 4, wherein said pivot connections are slidably mounted on rails secured to said one side edge.

6. Mobile living quarters as claimed in claim 2, wherein said first mentioned pair of linkages extend from said one of said side walls to said corresponding one side edge and a second said pair of linkages extend from the other side wall to a corresponding other side edge of the floor.

7. Mobile living quarters having a main living quarters and a slide out room movable relative to the main living quarters between a retracted position retracted within the main living quarters and an extended position extended from the main living quarters, said main living quarters having a main living floor and said slide out room having a slide out room floor, and linkage means extending between the main living quarters and said slide out room suspending said slide out room with the slide out room floor spaced above said main living floor during movement of said slide out room between the extended and retracted positions.

8. Mobile living quarters as claimed in claim 7, wherein an aperture is defined by opposite aperture side edges and said slide out room floor is defined between opposite slide out room floor side edges, said linkage means extending between said aperture side edges and a corresponding slide out room floor side edge.

9. Mobile living quarters as claimed in claim 8, wherein said linkage means includes a first pair of linkages extending between one of said aperture side edges and a corresponding slide out room floor side edge and a second pair of linkages extending between the other of said aperture side edges and the other slide out room floor side edge.

10. Mobile living quarters as claimed in claim 9, wherein each of said pairs of linkages includes a first linkage which expands as the slide out room is moved from the retracted to the expanded position and a second linkage which collapses as the slide out room is moved from the retracted to the expanded position, said first linkage contracting and the second linkage expanding as the slide out room moves from the expanded to the retracted position.

11. Mobile living quarters as claimed in claim 10, wherein each of said linkages include links pivotally connected to one of said aperture side edges and to said slide out room floor edge.

12. Mobile living quarters as claimed in claim 10, wherein each of said linkages includes links both pivotally and slidably connected to one of said aperture side edges and both pivotally and slidably connected to said slide out room floor edge.

13. Mobile living quarters as claimed in claim 12, wherein each of said linkages include pivots slidably connected to rails mounted on said aperture side edges.

14. Mobile living quarters: having a main living quarters and a slide out room movable relative to the main living quarters between a retracted position retracted within the main living quarters and an extended position extended from the main living quarters, said main living quarters having a main living floor and said slide out room having a slide out room floor, and operating means suspending said slide out room floor above said main living floor while permitting said slide out room floor to swing above said main living floor during movement of the slide out room between the expanded and retracted positions.

15. Mobile living quarters as claimed in claim 14, wherein said operating means includes supporting means supporting said slide out room and pivotally connected to both the main living quarters and the slide out room.

16. Mobile living quarters as claimed in claim 14, wherein said operating means includes supporting means supporting said slide out room and both pivotally and slidably connected to both the main living quarters and the slide out room.

17. Mobile living quarters as claimed in claim 16, wherein said operating means extends between a side wall of an aperture in the main living quarters through which the slide out room extends and retracts and an edge of said slide out room.

* * * * *